United States Patent Office 3,366,609
Patented Jan. 30, 1968

3,366,609
POLYMERIZATION OF EPISULFIDES
Stephen Adamek, Islington, Ontario, Canada, assignor to Dunlop Rubber Company Limited, London, England, a British company
No Drawing. Filed Aug. 27, 1965, Ser. No. 483,305
Claims priority, application Great Britain, Sept. 12, 1964, 37,384/64
27 Claims. (Cl. 260—79)

ABSTRACT OF THE DISCLOSURE

Polymerizing episulfides using Group IIB metal compound in presence of Group IA metal, Group IIA metal or ammonium salt of an amino-carboxylic acid.

---

This invention relates to a process for the preparation of polymers and more particularly to a process for the preparation of polymers of one or more episulphides.

According to the present invention a process for the preparation of a polymer comprises contacting one or more episulphides in an inert liquid medium with a polymerization catalyst being a compound of a metal of the "B" sub-Group of Group II of the Mendeleeff Periodic Table in the presence of a salt of an amino-carboxylic acid which is soluble in the inert liquid medium, and agitating the mixture.

According to the present invention also there is provided a polymer of one or more episulphides when prepared by the method according to the immediately preceding paragraph.

The polymerization catalyst comprises a compound of a metal of Group IIB of the Mendeleeff Periodic Table and can be, for example, an oxide or carbonate of the metal. The preferred catalysts are the oxides and carbonates of zinc and cadmium. The amount of the polymerization catalyst used can vary over a wide range for example from 0.05 percent to 10 percent by weight based on the total weight of monomers to be polymerized but it is preferred to use an amount within the range of from 0.5 percent to 5 percent by weight based on the monomer or monomers.

The salt of an amino-carboxylic acid must be soluble in the inert medium in which the polymerization reaction is effected. The salt will usually be a salt of a metal of the "A" sub-Groups of Groups I and II of the Mendeleeff Periodic Table or an ammonium salt. Of the metal salts which may be used, the preferred members are the sodium and potassium salts. The amino-carboxylic acid used to prepare the salt contains at least one amino-group and at least one carboxyl-group, but it is to be understood that groups other than amino-groups and carboxyl-groups may be present. The other group may, if desired, be another functional group. The preferred amino-carboxylic acids are those which contain two carboxyl groups, especially those which contain two carboxyl groups and which have an amino-group attached to a carbon atom which is in the alpha-position relative to one of the carboxyl groups. Examples of this latter type of amino-carboxylic acid are glutamic acid and aspartic acid.

The salt of an amino-carboxylic acid can be formed separately and added to the polymerization reaction mixture or it can be formed in situ within the polymerization reaction mixture by adding the metal ions or the ammonium ions and the acid and allowing these to react within the reaction mixture. In the latter case it is usual to add the metal ions or the ammonium ions in the form of a base such as sodium hydroxide or ammonium hydroxide.

The amount of the salt of an amino-carboxylic acid used will usually be at least 1 percent, and is preferably from 2 percent to 5 percent by weight based on the total weight of the monomer or monomers to be polymerized.

The inert medium in which the polymerization reacted is effected is a liquid medium which is chemically inert to all the ingredients of the polymerization reaction mixture. By a chemically inert medium there is meant a medium which has no chemical reaction with the ingredients, but it is to be understood that the medium may be a solvent for one or more of the ingredients. It is desirable that the inert medium should be a polar medium of high dielectric constant, and examples of suitable media are aliphatic organic alcohols such as isopropyl alcohol. The preferred inert medium is water. The amount of the inert medium used can be such that the resulting latex contains up to 60 percent by weight, based on the total weight of the latex, of solids, and of course, by increasing the amount of the inert medium used, latices containing less than 60 percent by weight of solids can be produced. To produce a latex containing about 60 percent by weight of solids, the amount of the inert medium used should be such that the polymerization reaction mixture initially contains about 60 percent by weight, based on the total weight of the mixture, of monomer or monomers to be polymerized. Substantially complete conversion of monomer to polymer is obtained by the method of the invention. The polymerization reaction mixture is agitated for instance by low or high speed stirring, until the polymerization reaction is completed. The time required to complete polymerization is usually several hours, but will depend upon the temperature employed. The temperature can conveniently be room temperature, although higher temperatures can be employed if desired. If the reaction is effected at room temperature then the time required will usually be from 15 hours to 25 hours.

The process of the invention can be used to prepare polymers and interpolymers of a wide variety of episulphides. Aliphatic, alicyclic or aromatic episulphides can be used, and examples of suitable episulphides are alkylene episulphides such as the episulphides of ethylene, propylene and butylene, unsaturated episulphides such as allyloxypropyl episulphide, vinyl ethyl episulphides and 1,5-hexadiene monoepisulphide, and aromatic episulphides such as styrene episulphides. Mixtures of the above episulphides can be interpolymerized, but if ethylene episulphide is incorporated then it is preferable to limit the amount of ethylene episulphide to below 35 mole percent.

The emulsions or latices formed by the method of the invention are preferably stabilized against sedimentation by the addition of a protective colloid such as blood serums, glue, shellac, alginates, starch, methyl cellulose, sodium polyacrylate, polyvinyl alcohol or casein. The stabilizer may be added to the polymerization reaction mixture prior to polymerization, i.e. with the monomer charge, or it may be added after the polymerization reaction is complete. The amount of the stabilizer used can be from 0.5 percent to 1.0 percent by weight based on the weight of the emulsion. In addition to the stabilizer a preservative such as phenyl mercuric acetate or sodium betachlorophenate may be added to the emulsion.

The invention is illustrated by the following examples:

EXAMPLE I

This example illustrates the preparation of polypropylene episulphide using cadmium carbonate as catalyst in the presence of sodium glutamate, formed in situ from sodium hydroxide and glutamic acid.

The following ingredients were charged into a clean reaction vessel:

| | | |
|---|---|---|
| Water | mls | 100 |
| Sodium hydroxide | g | 1 |
| Glutamic acid | g | 4 |
| Cadium carbonate | g | 2 |
| Propylene episulphide | mls | 50 |

The mixture was agitated by low speed stirring for 17 hours, after which time the polymerization reaction was substantially completed. The temperature was maintained at room temperature throughout. The product was a viscous, stable latex having a solids content of 12 percent by weight.

The above procedure was repeated five times (experiments 2–6) except that the sodium hydroxide and glutamic acid were used in the amounts shown in Table I below.

For purposes of comparison the above procedure was again repeated (experiment 7) except that the sodium hydroxide was omitted.

The properties of the latices obtained in experiments 1–7 are also shown in Table I, in which glu acid represents glutamic acid, ratio represents the molecular ratio of sodium hydroxide:glutamic acid, and solids indicates the percentage by weight of solids in the resulting latices:

TABLE I

| Expt. No. | NaOH (g.) | Glu acid (g.) | Ratio | Solids |
|---|---|---|---|---|
| 1 | 1 | 4 | 1.0 | 12 |
| 2 | 2 | 4 | 2.0 | 31 |
| 3 | 3 | 4 | 3.0 | 30 |
| 4 | 1 | 2 | 2.0 | 31 |
| 5 | 1.5 | 2 | 3.0 | 29 |
| 6 | 0.5 | 1 | 2.0 | 31 |
| 7 | | 2 | | |

The products obtained in experiments 1–6 were fluid latices, although the latex from experiment 1 had a high viscosity. The product obtained in experiment 7 was a coagulated mass.

The latices obtained in experiments 1–6 were centrifuged for 24 hours at 3,000 r.p.m. There was no visible sedimentation except in the case of the latex from experiment 5 which showed slight initial sedimentation but was otherwise stable. The latex from experiment 6 showed slight initial coagulation but no sedimentation.

These results show that stable latices can be obtained by the emulsion polymerization of propylene episulphide using cadmium carbonate as catalyst in the presence of sodium glutamate. The results also show that a latex is not obtained if glutamic acid is used instead of sodium glutamate.

EXAMPLE II

Propylene episulphide was polymerized by the procedure outlined in Example I but using 100 mls. of propylene episulphide and a molar ratio of sodium hydroxide: glutamic acid of 3.0. The amounts of the various ingredients are shown in Table II.

TABLE II

| Expt. No. | NaOH (g.) | Glu Acid (g.) | Ratio | Water | Solids |
|---|---|---|---|---|---|
| 1 | 6 | 8 | 3.0 | 100 | 50 |
| 2 | 3 | 4 | 3.0 | 100 | 50 |
| 3 | 1.5 | 2 | 3.0 | 100 | 46 |

In each experiment a viscous latex was obtained. The latices were centrifuged for 24 hours at 3,000 r.p.m., and no sedimentation occurred, although the latex from experiment 3 showed some phase separation.

EXAMPLE III

This example illustrates the types of aminocarboxylic acids other than glutamic acid which can be used in the method of the present invention.

The procedure outlined in Example I was repeated seven times but using the amounts of ingredients specified in Table III below in which PrS represents propylene episulphide. In each experiment 100 mls. of water and 2 grams of cadmium carbonate were used, and polymerization was allowed to proceed for 17 hours.

TABLE III

| Expt. No. | Acid | Wt. Acid (g.) | NaOH | PrS (ml.) | Solids |
|---|---|---|---|---|---|
| 1 | Asparagine | 2 | 1.5 | 50 | 34 |
| 2 | Lysine | 2 | 1.5 | 25 | 18 |
| 3 | Cystine | 2 | 1.5 | 25 | 18 |
| 4 | Glycine | 4 | 4.0 | 50 | 34 |
| 5 | Aspartic acid | 2 | 1.5 | 25 | 18 |
| 6 | do | 2 | 1.0 | 50 | 34 |
| 7 | do | 2 | 0.5 | 50 | 24 |

A latex was obtained in each experiment, the latices from experiments 1–3 being jelly-like and those from experiments 4–7 being fluids. Each latex was centrifuged for 24 hours at 3,000 r.p.m. without sedimentation, although the latex from experiment 4 became slightly coagulated.

EXAMPLE IV

This example illustrates the use of zinc compounds as the polymerization catalyst.

Propylene episulphide (50 mls.) was polymerized by the procedure given in Example I but using the ingredients specified in Table IV.

TABLE IV

| Expt. No. | Catalyst | Water (mls.) | NaOH (g.) | Glu Acid (g.) | Solids |
|---|---|---|---|---|---|
| 1 | ZnO (2 g.) | 100 | 2 | 3 | 34 |
| 2 | ZnO₂ (1 g.) | 100 | 2 | 3 | 32 |
| 3 | ZnCO₃ (2 g.) | 100 | 2 | 3 | 31 |

In each experiment a fluid latex was obtained which showed no sedimentation on centrifuging for 24 hours at 3,000 r.p.m. The latex from experiment 1 showed no sedimentation after standing for six months.

EXAMPLE V

This example illustrates the preparation of latices of polymers of more than one episulphide.

Polymers were prepared by the procedure given in Example I, but using the amounts of monomers given in Table V below. 1.5 grams of alkali were used in each experiment. In each experiment 100 mls. of water, 2 grams of cadmium carbonate and 2 grams of glutamic acid were employed. In Table V EtS represents ethylene episulphide, BuS represents butylene episulphide and ATPrS represents allyloxypropyl episulphide.

TABLE V

| Expt. No. | Alkali | PrS (mls.) | EtS (mls.) | AOPrS (mls.) |
|---|---|---|---|---|
| 1 | NaOH | 50 | 5 | |
| 2 | NaOH | 50 | 10 | |
| 3 | NaOH | 50 | | 2 |
| 4 | NaOH | 50 | | 5 |
| 5 | NaOH | 50 | 10 | 2 |
| 6 | NaOH | 50 | 10 | 5 |
| 7 | KOH | 50 | | 5 |
| 8 | KOH | 5 | 10 | 5 |

Each of the latices prepared in experiments 1–8 was stable and showed no sedimentation after centrifuging for 24 hours at 3,000 r.p.m.

EXAMPLE VI

This example illustrates the preparation of polypropylene episulphide using cadmium carbonate or zinc oxide as the catalyst in the presence of preformed disodium glutamate.

100 mls. of water, 4 grams of disodium glutamate and 2 grams of cadmium carbonate were charged into a clean vessel. 50 mls. of propylene episulphide were added and the mixture was agitated by tumbling for 17 hours at room temperature, after which time the polymerization reaction was essentially completed.

The experiment was repeated twice (experiments 2 and 3) but using the amounts of ingredients shown in Table VI below.

A further experiment (experiment 4) was carried out using the ingredients specified in Table VI, wherein zinc oxide is used as the catalyst instead of cadmium carbonate.

TABLE VI

|  | Experiment No. | | | |
| --- | --- | --- | --- | --- |
|  | 1 | 2 | 3 | 4 |
| Water (mls.) | 100 | 50 | 50 | 100 |
| Disodium glutamate (gms.) | 4 | 4 | 6 | 6 |
| CdCO$_3$ (gms.) | 2 | 2 | 2 |  |
| ZnO (gms.) |  |  |  | 2 |
| Propylene episulphide (mls.) | 50 | 50 | 50 | 30 |
| Solids content (percent) | 31 | 45 | 48 | 30 |

A stable fluid latex was obtained from each experiment.

Having now described my invention, what I claim is:

1. A process for the preparation of a polymer which comprises contacting one or more vicinal episulphides in an inert liquid medium with a polymerization catalyst consisting of a compound of a metal of the B sub-Group of Group II of the Mendeleeff Periodic Table in the presence of a Group IA metal, Group IIA metal or ammonium salt of an amino-carboxylic acid, which is soluble in the inert liquid medium, and agitating the mixture.

2. A process according to claim 1 in which the salt of an amino-carboxylic acid is present in an amount of at least 1 percent by weight based on the episulphide or episulphides to be polymerized.

3. A process according to claim 2 in which the amount is from 2 percent to 5 percent by weight based on the episulphide or episulphides to be polymerized.

4. A process according to claim 1 in which the salt of an amino-carboxylic acid is formed in situ within the polymerization reaction mixture.

5. A process according to claim 4 in which an inorganic base and an amino-carboxylic acid are added to the polymerization reaction mixture to form the salt of an amino-carboxylic acid.

6. A process according to claim 1 in which the polymerization catalyst is present in an amount of from 0.05 percent to 10 percent by weight based on the episulphide or episulphides to be polymerized.

7. A process according to claim 6 in which the amount of the polymerization catalyst is from 0.5 percent to 5 percent by weight based on the episulphide or episulphides to be polymerized.

8. A process according to claim 1 in which the polymerization catalyst is an oxide of a metal of the B sub-Group of Group II of the Mendeleeff Periodic Table.

9. A process according to claim 1 in which the polymerization catalyst is a carbonate of a metal of the B sub-Group of Group II of the Mendeleeff Periodic Table.

10. A process according to claim 1 in which the inert liquid medium is a polar medium.

11. A process according to claim 1 in which the amount of the inert liquid medium is such that the polymerization reaction product contains solids present in an amount up to 60 percent by weight.

12. A process according to claim 10 in which the inert liquid medium is water.

13. A process according to claim 10 in which the inert liquid medium is an aliphatic organic alcohol.

14. A process according to claim 9 in which the metal of the B sub-Group of Group II of the Mendeleeff Periodic Table is zinc.

15. A process according to claim 9 in which the metal of the B sub-Group of Group II of the Mendeleeff Periodic Table is cadmium.

16. A process according to claim 1 in which the salt of an amino-carboxylic acid is a salt of an acid having two —COOH groups and having an amino group in a position alpha with respect to one of said —COOH groups.

17. A process according to claim 16 in which the acid is glutamic acid.

18. A process according to claim 16 in which the acid is aspartic acid.

19. A process according to claim 1 which the metal of the A sub-Group of Group I of the Mendeleeff Periodic Table is sodium.

20. A process according to claim 1 in which the metal of the A sub-Group of Group I of the Mendeleeff Periodic Table is potassium.

21. A process according to claim 5 in which the inorganic base is sodium hydroxide.

22. A process according to claim 5 in which the inorganic base is ammonium hydroxide.

23. A process according to claim 5 in which the inorganic base is potassium hydroxide.

24. A process according to claim 1 in which the vicinal episulphide is an aliphatic episulphide.

25. A process according to claim 1 in which the vicinal episulphide is a cyclo-aliphatic episulphide.

26. A process according to claim 1 in which the vicinal episulphide is an aromatic episulphide.

27. A process according to claim 24 in which the aliphatic episulphide is propylene episulphide.

References Cited

UNITED STATES PATENTS

| 2,962,457 | 11/1960 | Mackinney | 260—79 |
| 3,222,324 | 12/1965 | Brodoway | 260—79 |
| 3,222,326 | 12/1965 | Brodoway | 260—79 |
| 3,287,375 | 11/1966 | McGregor | 260—327 |
| 3,291,809 | 12/1966 | Cyba | 260—327 |

FOREIGN PATENTS

| 1,042,149 | 9/1966 | Great Britain. |
| 1,042,253 | 9/1966 | Great Britain. |
| 702,315 | 1/1965 | Canada. |
| 1,363,722 | 5/1964 | France. |
| 1,371,277 | 7/1964 | France. |

OTHER REFERENCES

Boileau et al.: Academie des Sciences (Paris) Comptes Rendus, 254, pp. 2774–6 (1962), Apr. 6, 1962. Found in Scientific Library.

DONALD E. CZAJA, *Primary Examiner.*

M. I. MARQUIS, *Assistant Examiner.*